(12) United States Patent
Phillips et al.

(10) Patent No.: US 8,703,330 B2
(45) Date of Patent: Apr. 22, 2014

(54) NICKEL ZINC BATTERY DESIGN

(75) Inventors: Jeffrey Phillips, La Jolla, CA (US);
Samaresh Mohanta, San Diego, CA (US);
Zheng Gang Fan, Shenzhen (CN);
Chi Wang Yau, Escondido, CA (US);
Lou Ludek Uzel, San Diego, CA (US)

(73) Assignee: PowerGenix Systems, Inc., La Jolla, CA (US)

( * ) Notice: Subject to any disclaimer, the term of this patent is extended or adjusted under 35 U.S.C. 154(b) by 1303 days.

(21) Appl. No.: 11/116,113

(22) Filed: Apr. 26, 2005

(65) Prior Publication Data
US 2006/0240317 A1    Oct. 26, 2006

(51) Int. Cl.
*H01M 4/02* (2006.01)
*H01M 4/00* (2006.01)
*H01M 2/18* (2006.01)
*H01M 2/16* (2006.01)

(52) U.S. Cl.
USPC ............. 429/211; 429/94; 429/133; 429/246

(58) Field of Classification Search
USPC .................... 429/211, 94, 133, 246
See application file for complete search history.

(56) References Cited

U.S. PATENT DOCUMENTS

| | | | |
|---|---|---|---|
| 3,089,856 A | 5/1963 | Cyr et al. | |
| 3,287,164 A | 11/1966 | Arrance | |
| 3,287,166 A | 11/1966 | Arrance | |
| 3,348,976 A | 10/1967 | Francis et al. | |
| 3,432,351 A | 3/1969 | Davee et al. | |
| 3,558,356 A | 1/1971 | Jost | |
| 3,669,746 A | 6/1972 | Devitt et al. | |
| 3,870,564 A | 3/1975 | Takamura et al. | |
| 3,898,099 A | 8/1975 | Baker et al. | |
| 3,923,544 A | 12/1975 | Berchielli | |
| 3,951,687 A | 4/1976 | Takamura et al. | |
| 4,017,665 A | 4/1977 | Sandera et al. | |
| 4,037,033 A | 7/1977 | Takamura et al. | |
| 4,049,883 A | 9/1977 | Schenk et al. | |
| 4,091,181 A | 5/1978 | Merritt, Jr. | |
| 4,118,860 A | 10/1978 | Buckler et al. | |
| 4,130,696 A | 12/1978 | Gunther | |
| 4,273,841 A | 6/1981 | Carlson | |

(Continued)

FOREIGN PATENT DOCUMENTS

| | | |
|---|---|---|
| CA | 2380952 | 10/2003 |
| CN | 1271971 A | 11/2000 |

(Continued)

OTHER PUBLICATIONS

PCT International Search Report dated Nov. 23, 2006, from related International Application No. PCT/US2006/007390.

(Continued)

*Primary Examiner* — Helen O Conley
(74) *Attorney, Agent, or Firm* — Weaver Austin Villeneuve & Sampson LLP

(57) ABSTRACT

Nickel zinc cylindrical battery cell designs are described. The designs provided limit dendrite formation and prevent build up of hydrogen gas in the cell. The present invention also provides low-impedance cells required by rapid discharge applications. The cylindrical battery cells may have polarity opposite of that of conventional power cells, with a negative cap and positive can. The cylindrical cells may include a gel electrolyte reservoir.

17 Claims, 6 Drawing Sheets

(56) References Cited

U.S. PATENT DOCUMENTS

| | | | |
|---|---|---|---|
| 4,298,662 A | 11/1981 | Sugalski et al. | |
| 4,304,828 A | 12/1981 | Vaidyanathan | |
| 4,327,157 A | 4/1982 | Himy et al. | |
| 4,332,867 A | 6/1982 | Tsuda et al. | |
| 4,347,292 A | 8/1982 | Bernard et al. | |
| 4,364,422 A | 12/1982 | Brown et al. | |
| 4,552,821 A * | 11/1985 | Gibbard et al. | 429/57 |
| 4,554,227 A | 11/1985 | Takagaki et al. | |
| 4,696,875 A | 9/1987 | Gelmser et al. | |
| 5,043,235 A | 8/1991 | Seefeldt et al. | |
| 5,124,120 A | 6/1992 | Sklarchuck et al. | |
| 5,215,836 A | 6/1993 | Eisenberg | |
| 5,300,371 A | 4/1994 | Tomantschger | |
| 5,455,128 A | 10/1995 | Tanaka | |
| 5,462,820 A | 10/1995 | Tanaka | |
| 5,521,021 A | 5/1996 | Alexandres et al. | |
| 5,545,492 A | 8/1996 | Zito | |
| 5,604,054 A | 2/1997 | Ekern et al. | |
| 5,607,796 A * | 3/1997 | Jacus et al. | 429/165 |
| 5,626,988 A * | 5/1997 | Daniel-Ivad et al. | 429/229 |
| 5,707,756 A | 1/1998 | Inoue et al. | |
| 5,721,072 A | 2/1998 | Mototani et al. | |
| 5,741,606 A | 4/1998 | Mayer et al. | |
| 5,766,789 A | 6/1998 | James et al. | |
| 5,773,176 A | 6/1998 | Serenyi | |
| 5,804,334 A | 9/1998 | Yamamura et al. | |
| 5,856,040 A * | 1/1999 | Newman et al. | 429/165 |
| 5,863,676 A | 1/1999 | Charkey et al. | |
| 5,972,534 A | 10/1999 | Pasquier | |
| 6,025,094 A | 2/2000 | Visco et al. | |
| 6,287,719 B1 | 9/2001 | Bailey | |
| 6,287,720 B1 | 9/2001 | Yamashita et al. | |
| 6,368,365 B1 | 4/2002 | Chi et al. | |
| 6,372,380 B1 | 4/2002 | Kitami et al. | |
| 6,617,072 B2 | 9/2003 | Prasad et al. | |
| 6,620,543 B2 | 9/2003 | Li | |
| 6,653,017 B2 * | 11/2003 | Satoh et al. | 429/178 |
| 6,653,018 B2 | 11/2003 | Takahashi et al. | |
| 6,740,446 B2 | 5/2004 | Corrigan et al. | |
| 6,787,265 B2 | 9/2004 | Phillips | |
| 6,790,559 B2 | 9/2004 | Phillips | |
| 6,797,433 B2 | 9/2004 | Phillips | |
| 6,801,017 B2 | 10/2004 | Phillips | |
| 6,811,926 B2 | 11/2004 | Phillips | |
| 6,818,350 B2 | 11/2004 | Phillips | |
| 6,835,499 B2 | 12/2004 | Phillips | |
| 6,949,310 B2 | 9/2005 | Phillips | |
| 7,550,230 B2 | 6/2009 | Phillips et al. | |
| 7,820,330 B2 | 10/2010 | Iwakura et al. | |
| 7,833,663 B2 | 11/2010 | Phillips et al. | |
| 8,048,558 B2 | 11/2011 | Phillips et al. | |
| 2002/0022175 A1 | 2/2002 | Hallifax et al. | |
| 2002/0076606 A1 | 6/2002 | Matsumoto | |
| 2002/0164530 A1 | 11/2002 | Iwakura et al. | |
| 2002/0182501 A1 | 12/2002 | Phillips | |
| 2002/0192547 A1 | 12/2002 | Phillips | |
| 2003/0017390 A1 | 1/2003 | Probst et al. | |
| 2003/0113630 A1 | 6/2003 | Kainthla et al. | |
| 2004/0157120 A1 | 8/2004 | Wu et al. | |
| 2004/0185329 A1 | 9/2004 | Kainthla et al. | |
| 2005/0003270 A1 | 1/2005 | Phillips | |
| 2005/0048363 A1 | 3/2005 | Gordon et al. | |
| 2005/0064292 A1 | 3/2005 | Phillips et al. | |
| 2006/0207084 A1 | 9/2006 | Phillips et al. | |
| 2006/0240317 A1 | 10/2006 | Phillips et al. | |
| 2007/0020518 A1* | 1/2007 | Bito et al. | 429/181 |
| 2008/0163478 A1 | 7/2008 | Phillips et al. | |
| 2008/0166632 A1 | 7/2008 | Phillips et al. | |
| 2009/0202904 A1 | 8/2009 | Geng et al. | |
| 2009/0208839 A1 | 8/2009 | Geng et al. | |
| 2009/0233159 A1 | 9/2009 | Phillips et al. | |
| 2010/0033138 A1 | 2/2010 | Alger et al. | |
| 2010/0291439 A1 | 11/2010 | Phillips et al. | |
| 2011/0033747 A1 | 2/2011 | Phillips et al. | |
| 2011/0039139 A1 | 2/2011 | Phillips et al. | |
| 2011/0059343 A1 | 3/2011 | McKinney et al. | |
| 2011/0086252 A1 | 4/2011 | Phillips | |
| 2013/0171482 A1 | 7/2013 | Phillips et al. | |

FOREIGN PATENT DOCUMENTS

| | | |
|---|---|---|
| CN | 1076882 | 12/2001 |
| CN | 1434534 | 6/2003 |
| CN | 1437278 | 8/2003 |
| CN | 2632866 | 8/2004 |
| CN | 21134449 Y | 10/2008 |
| CN | 201466140 Y | 5/2010 |
| CN | 101777671 A | 7/2010 |
| EP | 0833397 | 4/1976 |
| EP | 0457354 | 11/1991 |
| EP | 0697746 | 2/1996 |
| EP | 0755087 | 1/1997 |
| EP | 1819002 | 8/2007 |
| EP | 2045855 | 4/2009 |
| FR | 2 415 882 | 8/1979 |
| FR | 2 796 496 A | 1/2001 |
| JP | 60167264 | 3/1985 |
| JP | 61-039452 | 2/1986 |
| JP | 06 283194 A | 10/1994 |
| JP | 07-502375 | 3/1995 |
| JP | 07296813 | 11/1995 |
| JP | 11-167933 | 6/1999 |
| JP | 2004-213947 | 7/2004 |
| WO | WO93/26056 | 12/1993 |
| WO | WO 00/30192 | 5/2000 |
| WO | WO 00/36686 | 6/2000 |
| WO | 01/18897 A | 3/2001 |
| WO | WO 02/39517 | 5/2002 |
| WO | WO 02/39520 | 5/2002 |
| WO | WO 02/39521 | 5/2002 |
| WO | WO 02/39534 | 5/2002 |
| WO | WO0239534 | 5/2002 |
| WO | WO 02/075830 | 9/2002 |
| WO | WO02075825 | 9/2002 |
| WO | WO03088381 | 10/2003 |
| WO | WO03088384 | 10/2003 |
| WO | 2005/020353 A2 | 3/2005 |
| WO | WO 2006/094110 | 9/2006 |
| WO | WO 2006/116496 | 11/2006 |
| WO | WO 2011/046952 | 4/2011 |

OTHER PUBLICATIONS

EP Office Action dated Apr. 25, 2008, from European Application No. 06758626.3.

Binder et al., "Corrosion Studies of Zinc Electrode Current Collector," Electrochemical Society Proceedings, vol. 95-14, pp. 48-65, 1996.

PCT International Search Report dated Oct. 25, 2006; App.#PCT/US2006/015807.

PCT Written Opinion dated Oct. 25, 2006; App#PCT/US2006/015807.

PowerGenix Systems, Inc. "PSI—A Supplier of battery, super capacitor and power systems solutions" from website www.powergenix.com, Aug. 10, 2002.

PowerGenix Systems, Inc. "Next Generation Rechargeable Batteries" Aug. 4, 2003.

PCT Search Report, PCT/US2004/026859, dated Feb. 18, 2005.

PCT Written Opinion, PCT/US2004/026859, dated Feb. 18, 2005.

Jindra "Sealed Ni-Zn cells 1996-1998" Journal of Power Sources, vol. 88, No. 2, Jun. 2000.

Jindra "Sealed Ni-Zn cells—1991-1995" Journal of Power Sources, vol. 66, 1997.

Coates et al., "Development of the nickel-zinc battery for commercial applications", Battery conference on Applications and Advances, 2000.

Pavlov et al., "Nickel-zinc batteries with long cycle life", Journal of Power Sources, vol. 62, No. 1, Sep. 1996.

Phillips et al., "Electrolyte Composition for Nickel-Zinc Batteries," U.S. Appl. No. 11/346,861, filed Feb. 1, 2006.

PCT International Search Report dated Jan. 26, 2007, from related International Application No. PCT/US2006/007390.

(56) References Cited

OTHER PUBLICATIONS

Office Action from Chinese Application No. 200480030693.3, dated Nov. 16, 2007.
"Long Life Sealed Nickel-Zinc Cell Using a New Separator", Journal of Power Sources, 9 (1983) pp. 147-159.
English language Abstract of Chinese Patent No. 143454A, downloaded on Dec. 21, 2007 from www.delphion.com.
European Office Action dated May 8, 2006 for European Application No. 04781526.1.
European Office Action dated Feb. 26, 2008 for European Application No. 06736671.6.
Chinese Office Action dated May 23, 2008 for Chinese Application No. 200480030693.3.
Chinese Office Action dated Sep. 12, 2008, for Chinese Application No. 200480030693.3.
Office Action dated Mar. 18, 2008 for U.S. Appl. No. 10/921,062.
Office Action dated Sep. 5, 2008 for U.S. Appl. No. 10/921,062.
Office Action dated Feb. 20, 2009 for U.S. Appl. No. 10/921,062.
Office Action dated Aug. 20, 2008 for U.S. Appl. No. 11/978,213.
Final Office Action dated Apr. 28, 2009 for U.S. Appl. No. 11/978,213.
Office Action dated Aug. 13, 2009 for U.S. Appl. No. 11/978,213.
Chinese Abstract for China Publication No. CN21134449Y, published Oct. 15, 2008.
International Search Report and Written Opinion dated Jun. 19, 2009 for Application No. PCT/US2009/038116.
Office Action dated Oct. 16, 2009 for U.S. Appl. No. 10/921,062.
Office Action dated Nov. 7, 2008 for Chinese Application No. 200680013711.6.
Office Action dated Feb. 27, 2009 for Chinese Application No. 200680014124.9.
Examination Report dated Apr. 21, 2009 for European Application No. 04781526.1.
Office Action dated Jun. 5, 2009 for Chinese Application No. 200680013711.6.
English Abstract of JP Appl. No. JP 61-039452, dated Feb. 28, 2008.
CN Office Action dated Mar. 11, 2010, from CN Appl. No. 200910150533.7.
CN Second Office Action dated Feb. 25, 2010, from CN Appl. No. 200680014124.9.
US Final Office Action dated May 14, 2010, from U.S. Appl. No. 10/921,062.
US Non-Final Office Action dated Oct. 1, 2009, from U.S. Appl. No. 11/367,028.
US Non-Final Office Action dated Dec. 24, 2008, from U.S. Appl. No. 11/978,209.
US Final Office Action dated Feb. 17, 2010, from U.S. Appl. No. 11/978,213.
CN Second Office Action dated Nov. 2, 2010, from CN Appl. No. 200910150533.7.
CN Third Office Action dated Jan. 8, 2010, from CN Appl. No. 200680013711.6.
JP Office Action dated Oct. 26, 2010, from JP Appl. No. 2006-524020.
US Notice of Allowance dated Jul. 15, 2010, from U.S. Appl. No. 10/921,062.
PCT International Search Report and Written Opinion, dated Feb. 3, 2011, issued in PCT/US2010/052355.
CN Third Office Action dated Apr. 8, 2011 issued in CN Appl. No. 200910150533.7.
CN Fourth Office Action dated Oct. 10, 2011 issued in CN Appl. No. 200910150533.7.
CN Notice of Allowance dated Feb. 16, 2012 issued in CN Appl. No. 200910150533.7.
CN Office Action dated Jun. 23, 2011 issued in CN Application No. 201010286502.7.
CN Second Office Action dated Nov. 25, 2011 issued in CN Application No. 201010286502.7.
CN Fourth Office Action dated Jan. 6, 2012, from CN Appl. No. 200680014124.9.
JP Second Office Action dated Nov. 7, 2011, from JP Appl. No. 2006-524020.
US Final Office Action, dated Jun. 13, 2011, issued in U.S. Appl. No. 12/900,206.
US Non-Final Office Action, dated Apr. 2, 2012, issued in U.S. Appl. No. 12/900,206.
US Office Action, dated Apr. 21, 2011, issued in U.S. Appl. No. 12/411,282.
US Notice of Allowance dated Aug. 15, 2011, issued in U.S. Appl. No. 12/411,282.
US Office Action dated May 13, 2011, issued in U.S. Appl. No. 12/903,004.
US Final Office Action dated Dec. 22, 2011, issued in U.S. Appl. No. 12/903,004.
US Office Action dated May 10, 2012, issued in U.S. Appl. No. 12/903,004.
CN Final Office Action dated Dec. 21, 2010, from CN Appl. No. 200680013711.6.
CN Third Office Action dated Nov. 22, 2010, from CN Appl. No. 200680014124.9.
US Non-Final Office Action dated Dec. 22, 2010, from U.S. Appl. No. 12/900,206.
PCT Intern'l Preliminary Examination Report dated Oct. 5, 2010 in PCT/US2009/038116.
CA Office Action dated Aug. 2, 2012 in Application No. 2,605,458.
CN Office Action dated Dec. 18, 2012 in CN Appl. No. 200910203934.4.
JP First Office Action dated Jun. 19, 2012 in Appl. No. 2008-509079.
US Office Action dated Jan. 9, 2013 in U.S. Appl. No. 11/978,213.
US Office Action dated Dec. 13, 2012 in U.S. Appl. No. 12/900,206.
US Final Office Action dated Feb. 1, 2013 in U.S. Appl. No. 12/903,004.
CN Office Action dated May 28, 2013 in CN Appl. No. 200910203934.4.
U.S. Appl. No. 13/753,299, filed Jan. 29, 2013.
Ohta et al., "Nickel Hydroxide Electrode: improvement of charge efficiency at high temperature" in The Electrochemical Society proceedings vol. 94-27 (Hydrogen and Metal Hydride Batteries edited by T.Sakai and P.D. Bennett), 1995, pp. 296-302.
PCT Intern'l Search Report & Written Opinion dated Jun. 11, 2013 in PCT/US2013/023667.

\* cited by examiner

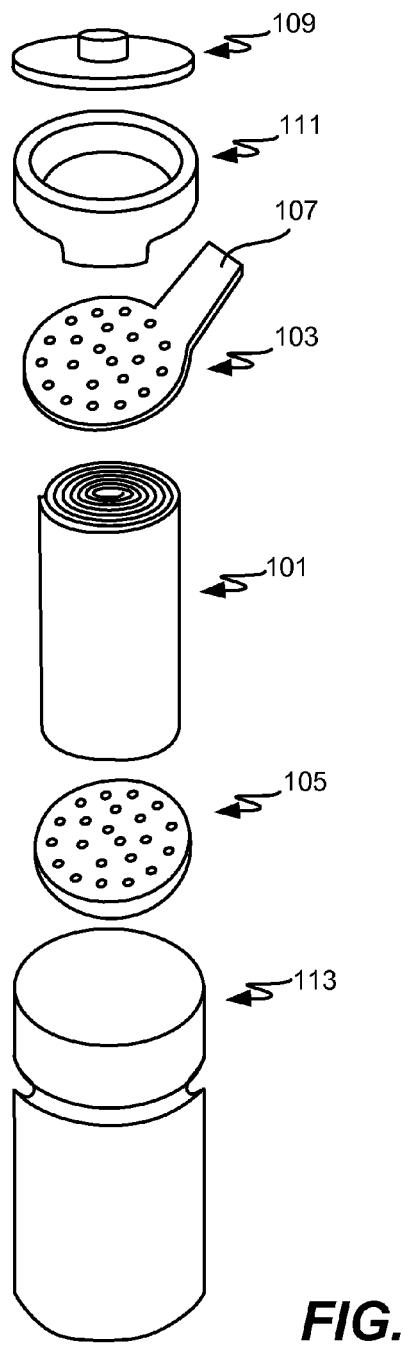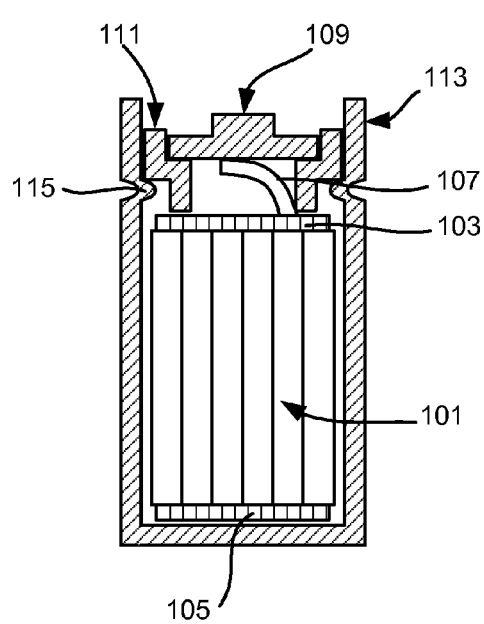
FIG. 1B
FIG. 1A

NICKEL ZINC BATTERY DESIGN

CROSS-REFERENCE TO RELATED APPLICATIONS

This application is related to U.S. patent application Ser. No. 10/921,062 filed Aug. 17, 2004, titled "Method of Manufacturing Nickel Zinc Batteries" by Jeffrey Phillips et al. as inventors and is hereby incorporated by reference for all purposes in its entirety.

BACKGROUND

1. Field of the Invention

The present invention relates to the rechargeable battery arts and more particularly to nickel zinc rechargeable battery design.

2. Description of the Related Art

The advent of portable communication and computation devices that allow diverse mobile connectivity has fueled growth and innovation in the rechargeable battery field. Increased capacity and power has made possible the entry of rechargeable power sources in various fields including the power tool arena. Because power tools typically have large current demands, rechargeable power sources have necessarily evolved to accommodate rapid discharge characteristics. It can be appreciated that the present invention will also find use in applications other than power tools such as Uninterruptible Power Supplies (UPS), Electric Vehicles, and high demand consumer electronics—all of which require high carrying capacity and current discharging ability. Of course, the invention also applies to relatively lower discharge rate applications such as many mainstream consumer electronics applications.

Because of the hazardous nature of some of the commonly used materials for conventional rechargeable power sources, it would be desirable to manufacture a rechargeable power source that reduces the quantity of any potentially hazardous materials. In particular, it would be desirable to find a substitute for the widely used nickel cadmium (NiCd) battery cell.

The rechargeable nickel zinc (NiZn) cells provide a power-to-weight ratio comparable to and even exceeding nickel cadmium cells at a reasonable cost. However, nickel zinc battery technology has not been widely deployed in part because it has been found to have a relatively limited cycle life. In other words, a given nickel zinc cell can only charge and discharge for a fraction of the cycles typically attained with a comparable nickel cadmium cell. This is due to zinc distribution and dendrite formation. Various advances in electrolyte composition and other chemistry improvements have reduced these issues, but they remain an important consideration in cell design.

The negative thermodynamic potential of zinc relative to cadmium and the metal hydride electrode, while allowing NiZn batteries to provide more power density than NiCd and Ni-metal hydride batteries, presents additional issues that are not addressed by conventional battery designs. First, nickel zinc batteries are more likely to evolve hydrogen. In addition, the main conductive paths associated with the negative electrode in conventional NiCd batteries are nickel plated steel. Nickel plated steel is not compatible with the negative zinc electrode.

There is a need therefore for a nickel zinc battery design that takes advantage of the improved performance offered by the battery chemistry, yet has a long cycle life and that is able to prevent hydrogen build-up.

SUMMARY

The present invention realizes the advantages described above by providing a nickel zinc battery design that limits dendrite formation, allows for low impedance copper conductive paths and limits build up of hydrogen gas in the cell. The present invention also provides low impedance cells required by rapid discharge applications.

In certain embodiments, the battery cells of the present invention comprise a cylindrical assembly of a zinc negative electrode, a nickel positive electrode, a separator that separates the positive and negative electrodes, and an electrolyte.

The battery cells of the present invention include a negative electrode comprising zinc and a positive electrode comprising nickel. In preferred embodiments, low carbonate zinc is used in the zinc electrode. Also in preferred embodiments, the positive electrode is a low carbonate positive electrode. In some embodiments, the low carbonate positive electrode is a dry processed electrode. In some embodiments, low carbonate components contain not more than about 1% by weight carbonate.

In preferred embodiments, the separator comprises a barrier layer to prevent zinc dendrite formation and a wetting layer to maintain hydration at the positive electrode. In some embodiments the barrier layer is adjacent to the positive electrode and the wetting layer is adjacent to the negative electrode. In other embodiments the barrier layer is adjacent to the negative electrode and the wetting layer is adjacent to the positive electrode. In some embodiments, a single separator material is used to both prevent zinc dendrite formation and serve as a wetting layer.

The battery cells of the present invention also include negative and positive current collector disks. In some embodiments the negative current collectors that electrically connect the negative collector disk to the negative electrode are bent or crimped to form a substantially flat and/or continuous surface for attaching the negative collector disk. This may be facilitated by the removal of some of the material from the area to be bent such that an improved fold may be achieved. The surface created provides for better attachment of the current collector and the collector disk, which improves reliability and lowers cell impedance.

In certain embodiments, the negative collector disk is made from at least one of copper, brass and tin. In a preferred embodiment, the negative collector disk is made from copper. In one embodiment, the negative collector disk comprises a copper disk the bottom of which is coated in tin. In this embodiment, the tin-coated copper disk may be soldered to the negative current collectors.

The collector disks should be shaped to allow attachment to the current collectors and addition of electrolyte to the cylindrical assembly. According to various embodiments, the collector disks may be perforated or unperforated circular disks. In one embodiment, the negative collector disk is a disk with triangular notches in the perimeter. In another embodiment, the negative collector disk is donut-shaped with a center hole to permit electrolyte to reach the center of the cylindrical assembly. In this embodiment, the positive collector disk is perforated to allow uniform electrolyte distribution. In one arrangement the disk is slotted with radial open sections and associated vertical energy directors that make intimate contact with the edge of the spiral wound electrodes. By using, for example, an inverter based millisecond pulse welding technique it is possible to make strong bonds to both the nickel and the copper current collectors.

In some cases, a non-welded pressure contact is employed. In certain embodiments, two circular disks (copper or other appropriate material) are connected together with a bent strip of metal (e.g., copper). The upper disk is resistance welded to the cap of the cylindrical cell (e.g., a sub-C cell) and the lower disk is pressurized (by spring action of the copper strip) to make electrical contact to the jellyroll. In certain embodiments, the spring may be a steel spring that has been plated with copper, tin, or another protective metal that has high hydrogen overpotential. Alternatively the spring may be substituted for with a pressurized rubber annulus or "o" ring that is resistant to the alkaline media.

A similar contact mechanism may be applied to the positive electrode. In this case the contact surface may employ two interconnected nickel disks pressurized by a similar spring arrangement. In certain embodiments, the disks are electroplated with cobalt.

The battery cells of the present invention may include a gel electrolyte reservoir. In certain embodiments, the reservoir is located at the bottom of cell, below the lower extent of an electrode/separator jellyroll.

In preferred embodiments, the cells of the present invention are of polarity opposite of that of conventional cylindrical power cells, with the cap negative and the can positive.

The battery cells of the present invention may facilitate recombination of hydrogen and oxygen by various mechanisms. In a preferred embodiment, the oxygen recombination rate supports at least about 150 mA. In some embodiments, recombination is facilitated by adding catalysts to various recombination surfaces. In some embodiments, recombination is facilitated by operating cells at starved conditions.

These and other features and advantages of the present invention will be described in more detail below with reference to the associated drawings.

BRIEF DESCRIPTION OF THE DRAWINGS

The invention may be understood more fully by reference to the following description taken in conjunction with the accompanying drawings in which:

FIG. 1a shows an exploded view of a battery cell according to one embodiment of the present invention.

FIG. 1b is a cross-sectional view of the battery cell shown in FIG. 1a

In the drawings like reference numerals designate like structural elements. Also, it is understood that the depictions in the figures are not necessarily to scale.

DETAILED DESCRIPTION OF PREFERRED EMBODIMENTS

Figure 2:
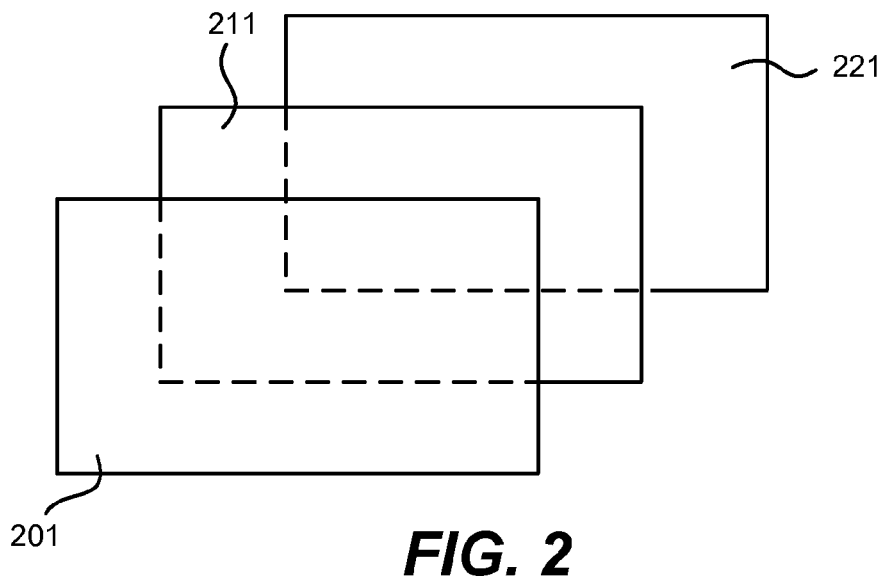
FIG. 2 is a representation of electrode and separator layers prior to winding.

The present invention relates to nickel zinc battery designs. As indicated above, nickel zinc battery design presents several challenges that are not addressed by conventional rechargeable battery design. These include zinc dendrite formation and redistribution of the zinc electrode ("shape change"), the use of copper conductive paths, and the propensity for hydrogen evolution at the zinc electrode.

Embodiments of this aspect of the invention are discussed below with reference to FIGS. 1-10. However, those skilled in the art will readily appreciate that the detailed description given herein with respect to these figures is for explanatory purposes as the invention extends beyond these limited embodiments.

FIGS. 1a and 1b are graphical representations of the main components of a cylindrical power cell according to one embodiment of the present invention, with FIG. 1a showing an exploded view of the cell. Electrode and electrolyte layers are in cylindrical assembly 101 (also called a "jellyroll"). Negative collector disk 103 and positive collector disk 105 are attached to opposite ends of cylindrical assembly 101. The negative and positive collector disks function as internal terminals, with the negative collector disk electrically connected to the negative electrode and the positive collector disk electrically connected to the positive electrode. Cap 109 and can 113 are external terminals. Negative collector disk 103 includes tab 107 to connect the negative collector disk 103 to cap 109. Positive collector disk 105 is electrically connected to cap 113. The embodiment shown in FIGS. 1a and 1b has a polarity reverse of that in a conventional NiCd cell, in that the cap is negative and the can positive. Gasket 111 rests on bead 115 and electrically insulates cap 109 from can 113.

FIG. 2 is a representation of electrode and separator layers prior to winding. Negative electrode 201 is separated from positive electrode 221 by separator 211. Negative electrode 201 includes a suitable electrochemically active zinc compound, typically zinc oxide and/or zinc metal, on a carrier sheet. Other electrochemically active zinc compounds such as calcium zincate may be used as well. As discussed above, zinc and zinc compounds are significantly less hazardous than the more commonly used cadmium compounds.

In certain embodiments, the zinc oxide is a low carbonate zinc oxide. The presence of carbonate neutralizes the electrolyte and can impede high rate discharge. U.S. patent application Ser. No. 10/921,062 (J. Phillips), filed Aug. 17, 2004, hereby incorporated by reference, describes manufacturing a low carbonate zinc electrode. As indicated, the carbonate content in such compositions is preferably not greater than about 1 percent by weight.

In addition to the zinc oxide or other electrochemically active zinc source, the negative electrode may include other materials that facilitate certain processes within the electrode such as ion transport, electron transport, wetting, porosity, structural integrity, active material solubility etc. For example, in some embodiments, the negative electrode includes another oxide such as bismuth oxide, indium oxide, and/or aluminum oxide. Bismuth oxide and indium oxide tend to mix with zinc and reduce gassing at the electrode.

U.S. patent application Ser. No. 10/921,062, referred to above, describes a method of manufacturing a negative electrode from a slurry containing additives in addition to zinc oxide. In a specific embodiment the slurry contains bismuth oxide, aluminum oxide, hydroxyethyl cellulose (HEC), and a dispersant. Indium oxide is also included in some embodiments. Various other formulations are possible, including those that employ other forms of zinc, such as calcium zincate or precursors thereof (e.g., calcium oxide and zinc oxide). Other electrode formulations include various inorganic fluorides, inorganic fibers such as alumina-silica fibers, and organic fibers such as cotton flock etc.

Other negative electrode compositions are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), U.S. Patent Publication No. 2002182501. Negative electrode additives in the above references include, for example, silica and fluorides of various alkaline earth metals, transition metals, heavy metals, and noble metals.

The carrier for the negative electrode (which may also serve as a current collector) should be electrochemically compatible with the negative electrode materials. The carrier sheet can be provided in various structural forms including a perforated metal sheet, an expanded metal, and a metal foam. Among the criteria employed to select a particular structural form are cost, ease of coating, and ability to facilitate electron transport between the electrochemically active electrode material and the current collector. For a zinc electrode, for example, the carrier material is preferably copper or an alloy of copper in the form of a perforated sheet or an expanded metal.

In a preferred embodiment, the thickness of the carrier is between about 2 and 5 mils for a perforated sheet but may be between 2 and 20 mils for expanded metal. Metal foam substrates may be between 15 and 60 mils. In a particularly preferred embodiment, the carrier is 3-4 mils of perforated copper. A specific range for the thickness of the negative electrode, including the carrier metal, zinc oxide and other negative electrode materials is about 10 to 24 mils.

Positive electrode 221 preferably has a composition similar to that employed to fabricate the nickel electrode in a conventional nickel cadmium battery, although there may be some important optimizations for the nickel zinc battery system. The electrochemically active material is preferably nickel hydroxide ($Ni(OH)_2$), although a nickel oxide or nickel oxy-hydroxide may also be used.

Zinc oxide and cobalt oxide may be employed in the positive electrode to improve charge transfer efficiency by creating conductive channels through the positive electrode materials. In a specific example, these oxides may be co-precipitated with or otherwise locked into the matrix of insoluble nickel material to prevent their leaching out of the positive electrode.

If cobalt metal is employed in the positive electrode, it is preferably present in a concentration of between about 1% to 10% by weight. This concentration range is appropriate for a wide range of discharge rates (e.g., about 0.001 to 0.4 Å/cm$^2$ of zinc electrode surface area). In a typical high rate application (e.g., discharge is conducted at about 0.01 to 0.4 Å/cm$^2$ of zinc electrode surface area), the concentration of cobalt metal is between about 4-10% by weight in the positive electrode. In a typical low rate application, the concentration of cobalt metal is between about 1-5% by weight, and the discharge is conducted at about 0.001 to 0.01 Å/cm$^2$ of zinc electrode surface area.

As suggested above, cobalt oxide may also (or alternatively) be added to the material to enhance conductivity. Note that in commercial nickel cadmium cells, free cobalt oxide is commonly employed in the positive electrode mixture.

A nickel foam matrix is preferably used to support the electroactive nickel (e.g., $Ni(OH)_2$) electrode material. In one example, commercially available nickel foam by Inco, Ltd. may be used. The diffusion path to the $Ni(OH)_2$ (or other electrochemically active material) through the nickel foam should be short for applications requiring high discharge rates. At high rates, the time it takes ions to penetrate the nickel foam is important. The width of the positive electrode, comprising nickel foam filled with the $Ni(OH)_2$ (or other electrochemically active material) and other electrode materials, should be optimized so that the nickel foam provides sufficient void space for the $Ni(OH)_2$ material while keeping the diffusion path of the ions to the $Ni(OH)_2$ through the foam short. The foam substrate may be may be between 15 and 60 mils. In a preferred embodiment, the thickness of the positive electrode, comprising nickel foam filled with the electrochemically active and other electrode materials, ranges from about 16-24 mils. In a particularly preferred embodiment, positive electrode is about 20 mils thick.

The density of the nickel foam should be optimized to ensure that the electrochemically active material uniformly penetrates the void space of the foam. In a preferred embodiment, nickel foam of density ranging from about 300-500 g/m$^2$ is used. An even more preferred range is between about 350-500 g/m$^2$. In a particularly preferred embodiment nickel foam of density of about 350 g/m$^2$ is used. As the width of the electrode layer is decreased, the foam may be made less dense to ensure there is sufficient void space. In a preferred embodiment, a nickel foam density of about 350 g/m and thickness ranging from about 16-18 mils is used.

A few positive electrode compositions are described in the following documents, each of which is incorporated herein by reference: PCT Publication No. WO 02/039534 (J. Phillips) (co-precipitated $Ni(OH)_2$, CoO and finely divided cobalt metal) and (J. Phillips) U.S. Patent Publication No. 20020192547 filed Mar. 15, 2002 (fluoride additives)

Methods of making electrodes include wet and dry processes. Wet processes are described in U.S. patent application Ser. No. 10/921,062, referred to above. However, wet processes may introduce organic materials into the nickel foam matrix. The presence of these organic materials are undesirable as they reduce conductivity. In a preferred embodiment, the positive electrode is made by a dry process which does not employ substantial water or other liquid. The component materials of nickel hydroxide, nickel and cobalt powders are dry blended together with a suitable binder and are introduced into a hopper. A continuous strip of foam nickel is drawn through the powder while rotating brushes force material into the foam pores. A compression roller step sizes the foam to the appropriate porosity.

Separator 211 serves to mechanically isolate the positive and negative electrodes, while allowing ionic exchange to occur between the electrodes and the electrolyte. The separator also blocks zinc dendrite formation. Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

In a preferred embodiment, the separator comprises two layers—a barrier layer to block zinc penetration and a wetting layer to keep the cell wet with electrolyte, allowing ionic exchange. This is generally not the case with nickel cadmium cells, which employ only a single separator material between adjacent electrode layers.

Performance of the cell may be aided by keeping the positive electrode as wet as possible and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80, and an average pore size of between about 0.005 and 0.3 micron will be suitable. In a preferred embodiment, the barrier layer is a microporous polyethylene. Examples of commercially available materials for the barrier layer are the SOLUPORE™ products from Solutech of Heerlen, Netherlands, the CELGARD™ line of separators from Celgard Inc. of Charlotte, N.C., and AMS products from Advanced Membrane Systems. The barrier layer is typically about 0.5-4 mils thick, more preferably between about 2 and 4 mils thick. Specific examples of barrier layer membranes include a 4 mil AMS separator, 2 layers of a 1 mil thick SOLUPORE™ separator and 2 layers of 1 mil thick CELGARD™ separator.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include Freudenberg FS2213E, Scimat 650/45 (SciMAT Limited, Swindon, UK), and Vilene FV4365 ( ).

Other separator materials known in the art may be employed. As indicated, nylon-based materials and microporous polyolefins (e.g., polyethylenes and polypropylenes) are very often suitable.

In an alternate embodiment, a single separator material may be used to block zinc penetration and to keep the cell wet with electrolyte. The single separator material may be a separator used in a conventional lithium ion cell but modified for use in the nickel zinc cell. For example, the lithium ion-type separator may be impregnated with a gel to improve its wettability characteristics. One such example is the polyethylene Teklon material available from Entek Membranes LLC, Lebanon, Oreg. This material is 20 microns thick with approximately 40% porosity. Gel may be provided to the separator directly or indirectly by, for example, be adding it to the zinc electrode. Gel electrolytes are employed in some embodiments as explained below.

Another consideration in the electrode/separator design is whether to provide the separator as simple sheets of approximately the same width as the electrode and currently collector sheet (e.g., FIG. 2) or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

Figure 3:
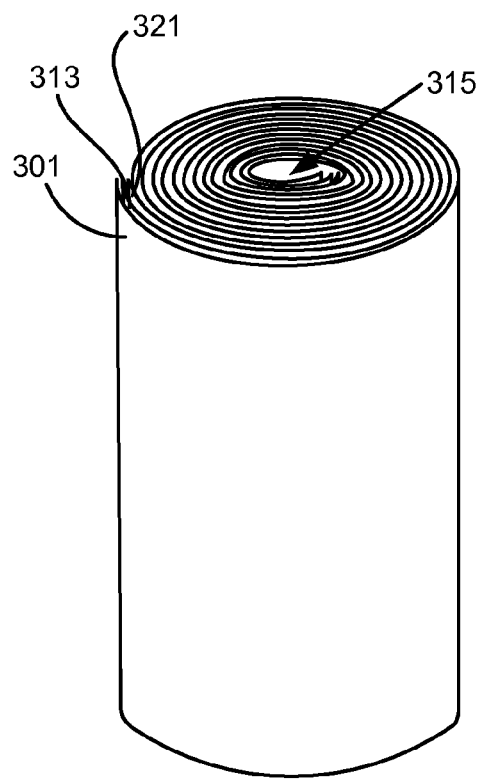
FIG. 3 is a representation of electrode and separator layers in a cylindrical "jellyroll" assembly.

FIG. 3 is a representation of electrode and separator layers in a cylindrical or jellyroll-like assembly. The jellyroll is formed from the cut electrode and separator sheets described above. Negative electrode 301 and positive electrode 321 are separated by separator 313. A winding apparatus draws the various sheets in at the same time and rolls them into the jellyroll-like structure. After a cylinder of sufficient thickness is produced, the apparatus cuts the layers of separator and electrodes to produce the finished cell assembly. A hollow core 315 extends through the center of the assembly. The radius and shape of the core may be controlled by the winding tool which holds the sheets of electrode and separator during winding.

Figure 4:
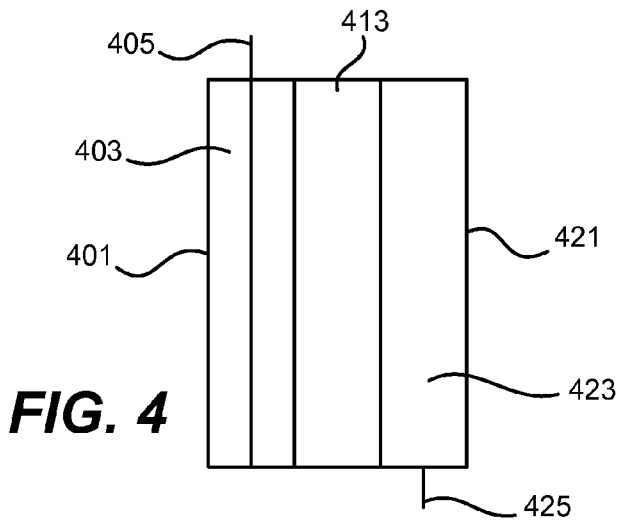
FIG. 4 is a cross-sectional representation of one set of electrode and separator layers in cylindrical assembly.

FIG. 4 is a vertical cross-sectional representation of one set of electrode and separator layers in a cylindrical assembly. These layers are wound together in a spiral to form the jellyroll. A negative electrode 401 includes the electrochemically active material 403, e.g. zinc oxide, and any other negative electrode materials, and a current collector 405. Similarly, a positive electrode 421 includes a current collector 423 (e.g., a nickel foam substrate in this embodiment) filled with $Ni(OH)_2$ and other positive electrode materials. Note that a metal tab 425 is attached the nickel foam positive current collector 423.

Negative current collector 405 extends past separator 413 at one axial end of the assembly and positive current collector tab 425 extends past separator 413 at the other axial end. As discussed above, the carrier for the electrochemically active material in this embodiment serves as the negative current collector. Thus, as shown in FIG. 3, the negative current collector is co-extensive with the other negative electrode materials at the positive end of the assembly. In a preferred embodiment, the negative current collector is copper of thickness of about 3-4 mils. The positive current collector is typically nickel. In a preferred embodiment, shown in FIG. 4, the positive current collector tab 425 is a nickel sheet of about 3 mils thickness spot welded or otherwise attached to the nickel foam substrate.

Figure 5A:
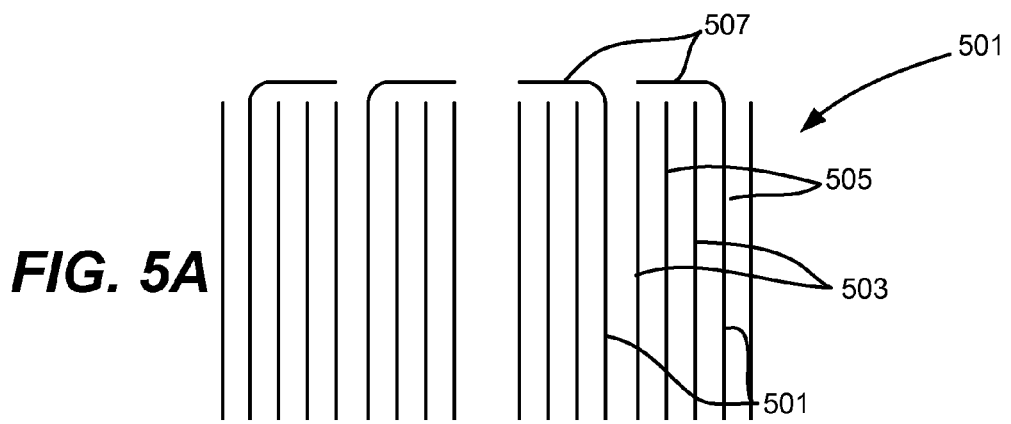
FIGS. 5a and 5b are representations of bent current collectors at the negative end of a cylindrical assembly according to various embodiments of the present invention.

FIG. 5a shows a cross-sectional view of the negative end of a cylindrical assembly 510 prior to attaching the disk (e.g., collector disk 103 in FIG. 1A) to the assembly according to one embodiment of the present invention, with negative electrode layers 501, separator layers 503, positive electrode layers 505 and negative current collectors 507. As indicated above, a negative collector disk is attached to the negative end of the cylindrical assembly and is electrically connected to the negative electrode via the current collectors. FIG. 5a shows one embodiment in which the current collectors 501 are bent at acute angles (e.g., about 90 degrees) prior to attaching the collector disk to form a substantially flat and continuous surface. Bending the current collectors increases the surface area available for attachment. It is important that the negative current collectors do not contact the positive electrode 505. In some embodiments, it may be necessary to cover the ends of the positive electrode at the negative end of the cylindrical assembly.

Figure 5B:
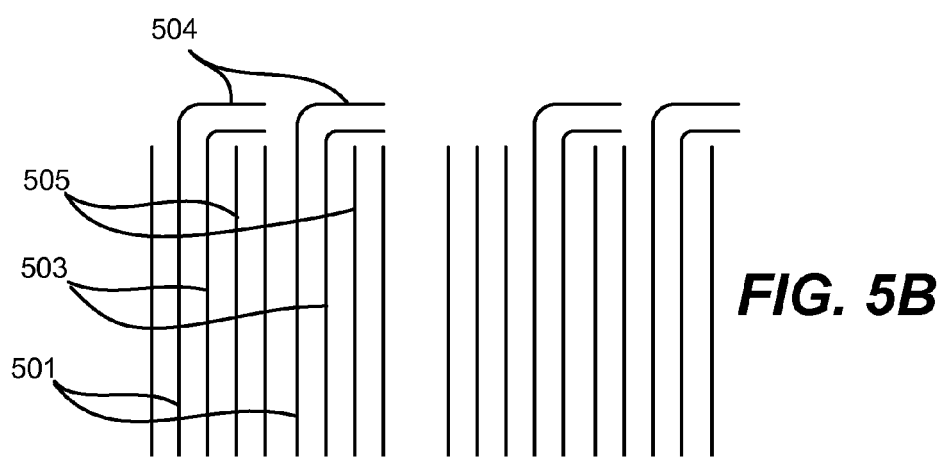

FIG. 5b shows another embodiment in which the bent current collectors are separated from the positive electrode by separator layers 503. In this embodiment, the separator layers extend further than the positive electrodes at the negative end of the cylindrical assembly. Although negative and/or positive current collectors may be bent prior to attaching the collector disks, in a specific embodiment, only the negative current collectors are bent to improve attachment to the negative collector disk. As explained below, the copper-to-copper contact presents particular challenges. Hence, configurations such as those shown in FIGS. 5a and 5b are particularly desirable for the negative electrode. The current collectors may be bent toward the center of the assembly as shown in FIG. 5a, or facing one direction as shown if FIG. 5b. In some embodiments, the current collectors may be predisposed in the desired direction before being pressed flat, e.g., by scoring at or near the bending point. In other embodiments, the current collectors are predisposed to bending while being wound in the jellyroll. In order to provide unimpeded bending, sections of the current collectors (from the area to be bent) may be removed to create a saw-tooth or battlement configuration. This may be most conveniently done during the perforation process of the foil manufacture. The surface created provides for better attachment of the current collector and the collector disk, which improves reliability and lowers cell impedance.

Among the main considerations for collector disks are conductivity, attachability to the current collectors, and allowing uniform distribution of electrolyte. The latter point can be understood by recognizing that electrolyte must normally be added after at least one of the current disks has been properly placed in the cell and attached to the electrode current collector. In a specific embodiment, positive collector disks are perforated nickel disks. In one arrangement, the disk is slotted with radial open sections and associated vertical energy directors that make intimate contact with the edge of the spiral wound electrodes. By using, for example, an inverter based millisecond pulse welding technique it is possible to make strong bonds to both the nickel and the copper current collectors.

Negative collector disks may be made of any material that will not corrode at the potential of the zinc electrode and may be electrically connected to the current collectors. The material should possess a high conductivity so that collector disk does not contribute a large impedance that reduces the power efficiency of the battery.

According to various embodiments, the negative collector disk comprises a material selected from copper, a copper alloy, e.g. brass, and tin. These metals are preferred in part because they do not readily evolve hydrogen at the potential of the zinc electrode and they have low resistivity. In a particularly preferred embodiment, the negative collector disk is copper or a copper alloy.

The disk may be attached to the current collector by various methods known in the art such as spot welding, ultrasonic welding, laser welding, soldering, and other types of electro-conductive bonding appropriate for the terminal and current collector materials. While copper is favored in some embodiments for its low resistivity and other properties, it presents a particular challenge for attachment to the negative current collector of the jellyroll. A copper disk is typically attached to the copper current collectors by resistance welding or laser welding. In some embodiments, the copper disk also comprises tin to improve attachability. For example, the bottom of the disk may be coated with tin or a tin alloy, which can serve as a solder bonding to the negative current collectors. The collector disk may also be brass. Brass collector disks are less conductive than copper but may have superior attachability.

Figure 6A:
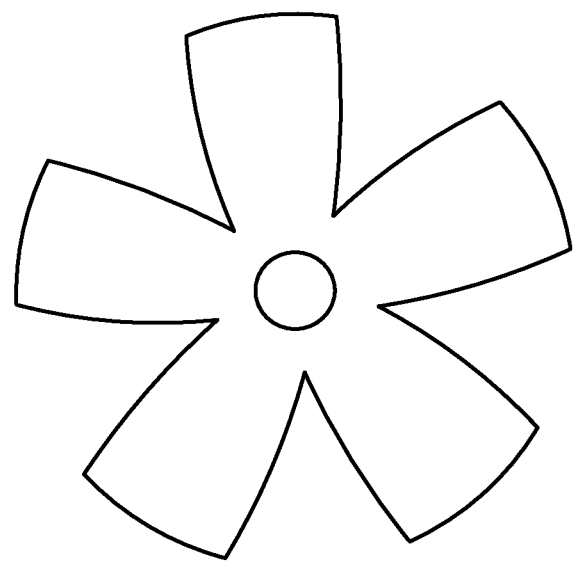
FIGS. 6a and 6b are representations of collector disks according to various embodiments of the present invention.
Figure 6B:
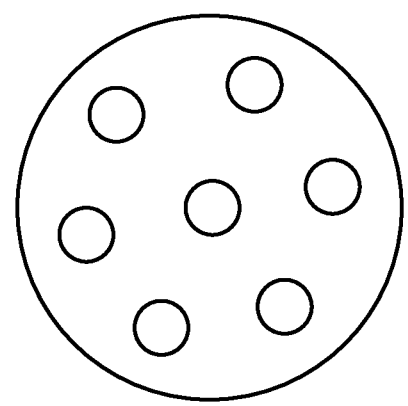

After the collector disks are attached, the entire jellyroll assembly is inserted into a retaining vessel, such as a can. In certain processes, electrolyte is then added to the cylindrical assembly. Thus, the disks should be shaped to allow electrolyte to enter the body of the cell and be evenly distributed through the cylindrical assembly as well as to allow attachment to the current collectors. According to various embodiments, the disks may or may not be perforated or slotted. In another embodiment, the collector disks comprise H-shaped structures. FIG. 6a shows a collector disk that is a circular disk with a center hole and triangular notches or "cake slices" removed from the perimeter. The design shown in FIG. 6a has been found to be relatively easy to weld. FIG. 6b shows a disk with holes spaced to permit uniform distribution of the electrolyte. Providing a collector disk that permits uniform electrolyte distribution becomes increasingly important as the amount of electrolyte used is decreased. Uniform distribution is important during fill as well as for reincorporation of any electrolyte that leaks out of the assembly during normal operation. For example, some electrolyte may make its way above the collector disk during operation and then must then find its way back into the jellyroll. When this occurs, the disk design may facilitate uniform distribution of the electrolyte as it flows back into the jellyroll. The holes may be uniformly spaced or otherwise arranged to optimize uniform distribution. For example, the holes may be spaced in a spiral arrangement so that they overlay the separator layers when the disk is attached to the electrode.

In conventional power cell manufacturing, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a preferred embodiment of this invention, the polarity of the cell is opposite of that of a conventional cell. Thus, the negative electrode is electrically connected with the cap and the positive electrode is electrically connected to the can. As discussed above with reference to FIGS. 1a and 1b, the cap is a normally connected with the collector disk by a tab. The collector disk connected with the can is normally welded or otherwise attached to the can.

Figure 7A:
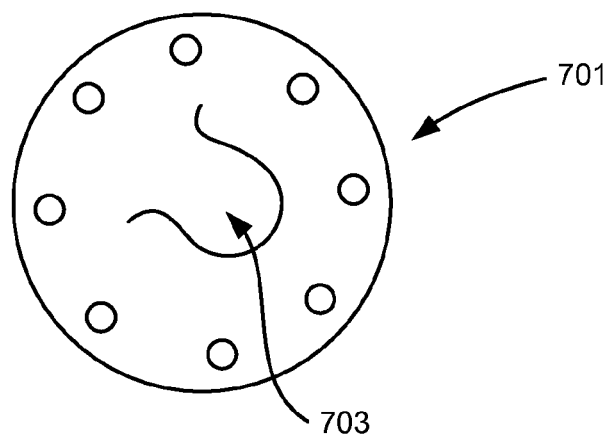
FIG. 7a is a representation of a positive collector disk according to one embodiment of the present invention.

FIG. 7a shows a perforated collector disk 701 with a U-shaped indent 703. Part of the U-shaped indented portion of the disk is attached to the can while the rest of the disk rests above the bottom of the can. In this way, the U-shaped portion functions as a spring that provides stability to the assembly if vibrated. In certain embodiments, the distance between the rest of the disk (i.e. the un-indented portion) and the bottom of the can is about 5-10 mils.

Various techniques may be employed to fill the vessel with electrolyte. In one example, the electrolyte may be added prior to cap application and the cell is then spun to distribute the fluid. In other cases, the electrolyte is introduced via an injection process in which electrolyte enters the cell via a fill port located in the base of the cell after the cap is applied.

Figure 7B:
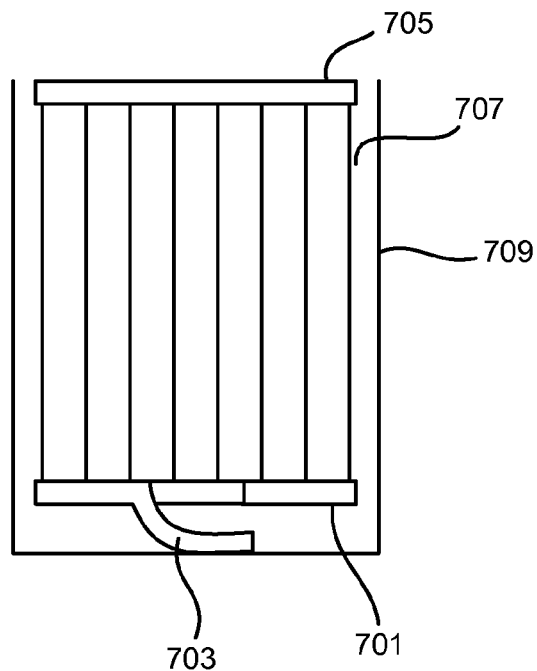
FIG. 7b is a representation of a cylindrical electrode/separator assembly and collector disks in a can according to one embodiment of the present invention.

FIG. 7b shows positive collector disk 701 and negative collector disk 705 attached to cylindrical assembly 707 in can 709. Positive collector disk 701 has a U-shaped indent 703 attached to one end of can 709. In a preferred embodiment, positive collector disk 701 is perforated and negative collector disk 705 is a donut-shaped disk containing a center hole. Most of the electrolyte added through the center hole of the negative collector disk is then forced down the assembly, through the center hole of the positive disk to the bottom of the can where it is forced upward on the cell perimeter and then reaches the electrodes in the jellyroll assembly through the perforations in the positive collector disk. As only the center hole of the negative collector is used for electrolyte fill, the structure or shape of remainder of the disk may be determined solely by attachability requirements. In one embodiment, the surface of the remainder of the negative collector disk is unperforated to maximize the surface area available for attachment to the current collectors. See e.g., the disk structure in FIG. 6a.

In another embodiment, the negative collector disk is solid and the electrolyte is not added through the negative collector disk but only through the positive collector disk. This embodiment may require a fill port. In a related approach, a negative can design can be employed.

The electrolyte should possess a composition that limits dendrite formation and other forms of material redistribution in the zinc electrode. Such electrolytes have generally eluded the art. But one that appears to meet the criterion is described in U.S. Pat. No. 5,215,836 issued to M. Eisenberg on Jun. 1, 1993, which is hereby incorporated by reference. A particularly preferred electrolyte includes (1) an alkali or earth alkali hydroxide present in an amount to produce a stoichiometric excess of hydroxide to acid in the range of about 2.5 to 11 equivalents per liter, (2) a soluble alkali or earth alkali fluoride in an amount corresponding to a concentration range of about 0.01 to 1 equivalents per liter of total solution, and (3) a borate, arsenate, and/or phosphate salt (preferably potassium borate, potassium metaborate, sodium borate, and/or sodium metaborate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH), NaOH, LiOH. This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

Figure 8:
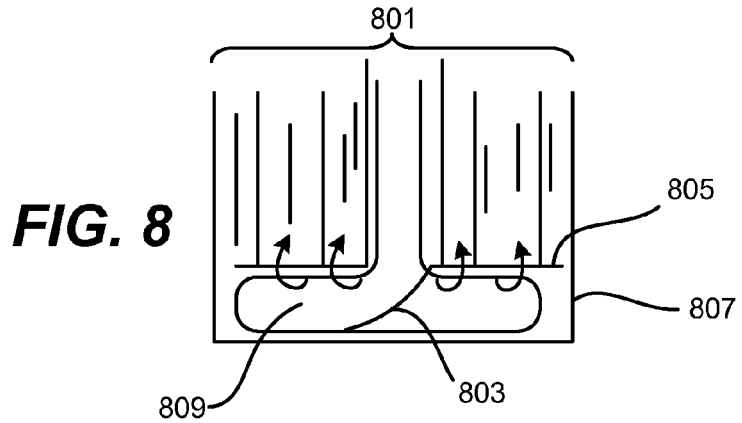
FIG. 8 is a representation of a cylindrical assembly and gel reservoir in a can according to one embodiment of the present invention.

FIG. 8 shows the positive end of a cylindrical assembly 801 and can 807 according to one embodiment of the present invention. A portion 803 of positive collector disk 805 is attached to the end of can 807 as described above with reference to FIGS. 7a and 7b. Some of the electrolyte is in the form of a gel which serves as a non-spillable reservoir 809 for electrolyte that may decompose (e.g., through hydrogen evolution). As indicated by the arrows, electrolyte from reservoir 809 moves up through the perforated collector disk 805 to the cylindrical assembly as needed. The gel may be added to the cylindrical assembly before, during or after the liquid electrolyte is added. In one embodiment, the liquid electrolyte is added through the center hole of the negative collector disk. Liquid electrolyte travels down the center portion the assembly, under the positive collector disk and wicks up through the perforated collector disk to uniformly fill the assembly. Gel electrolyte is then added through the center hole in the negative collector disk, displacing liquid electrolyte remaining in the center of the assembly or base.

The can or other vessel serves as the outer housing or casing of the final cell. In conventional NiCd cells, the can is often nickel-plated steel. As indicated above, the can may either be positive or negative. In embodiments wherein the can is negative, the can material may a composition similar to that employed in a conventional nickel cadmium battery, such as steel, as long as the material is compatible with the potential of the zinc electrode. In some embodiments that employ a negative can, the can is coated with a zinc-compatible material such as copper to prevent corrosion. As mentioned, in certain embodiments, the can is positive and the cap negative. The can may be a composition similar to that used in convention cells, typically nickel-plated steel. In some embodiments, the interior of the can may be coated with a material to aid oxygen-hydrogen recombination. Any material that catalyzes hydrogen-oxygen recombination may be used. An example of such a material is silver oxide.

After the can or other containment vessel is filled with electrolyte, the vessel is sealed to isolate the electrodes and electrolyte from the environment as shown in FIG. 1b. The cylindrical assembly or jellyroll 101 is located inside can 113. Positive collector disk 105 is welded or otherwise attached to can 113 as discussed above with respect to FIGS. 7a and 7b. Negative collector disk 103 is electrically connected to cap 109 through tab 107. Cap 109 is electrically isolated from can 113 through the use of flexible gasket 111. Gasket 111 resides on a circumferential bead 115 in the upper portion of can 113.

In a preferred embodiment, the bead 115 on which gasket 111 rests is coated with a polymer coating. The gasket may be any material that electrically isolates the cap from the can. Preferably the material does not appreciably distort at high temperatures; one such material is nylon. In other embodiments, it may be desirable to use a less wettable material to reduce the driving force that causes the alkaline electrolyte to creep and ultimately leak from the cell at seams or other available egress points. An example of a less wettable material is polypropylene.

The gasket is typically sealed by a crimping process. In a preferred embodiment, the gasket a sealing agent is used to prevent leakage. Examples of suitable sealing agents include bituminous sealing agents, tar and VERSAMID® available from Cognis of Cincinnati, Ohio. The cap may be made of any suitable conductive material. In a preferred embodiment, the cap is copper-plated steel.

Figure 9:
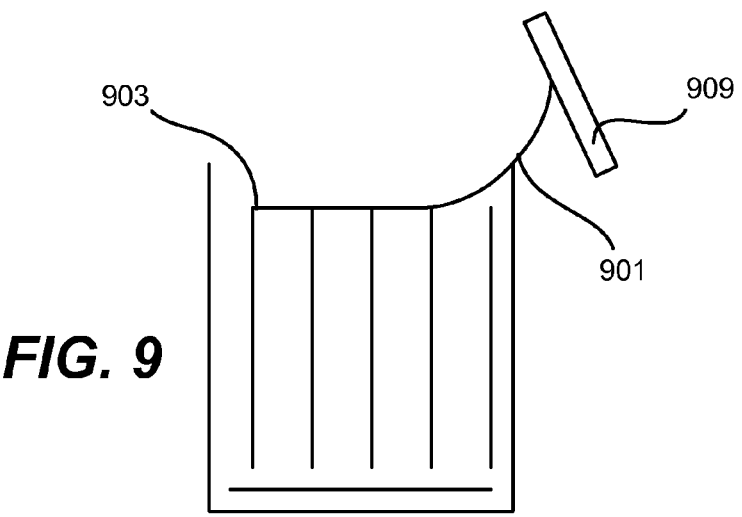
FIG. 9 is a representation of a cylindrical assembly, can and cap during the electrolyte fill process.

FIG. 9 presents a representation of a cylindrical cell during electrolyte fill. Tab 911 electrically connects collector disk 913. In this embodiment, tab 911 is long enough to allow cap 909 to be open during the filling process. Because of its length, it is important to use a highly conductive material for tab 911 to minimize impedance. Thus, in a preferred embodiment, cap 909 is negative and tab 911 is made of a highly conductive material such as copper. In conventional NiCd cells, the cap is positive and the conductive paths typically comprise nickel.

Although the cell is generally sealed from the environment, the cell may be, in some embodiments, permitted to vent gases from the battery that are generated during charge and discharge. A typical nickel cadmium cell vents gas at approximately 200 PSI. In some embodiments, a nickel zinc cell of this invention is designed to operate at this pressure and even higher (e.g., up to about 300 PSI) without the need to vent.

This may encourage recombination of any oxygen and hydrogen generated within the cell. Preferably the cell is constructed to maintain an internal pressure of not greater than about 600 PSI and more preferably not greater than about 450 PSI. In other embodiments, a nickel zinc cell is designed to vent gas at relatively lower pressures. This may be appropriate when the design encourages release of hydrogen and/or oxygen gases over their recombination within the nickel zinc cell.

Figure 10:
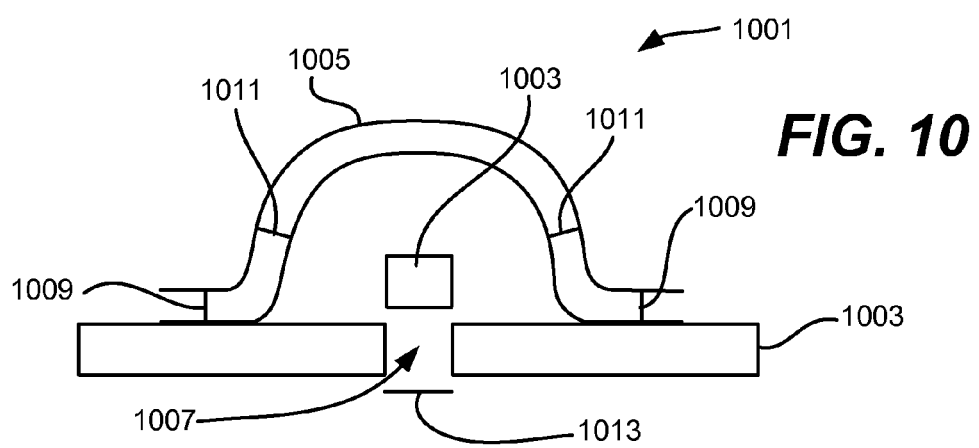
FIG. 10 is a representation of a cap and vent mechanism according to one embodiment of the present invention.

FIG. 10 is a representation of a cap and vent mechanism according to one embodiment of the invention. The vent mechanism is preferably designed to allow gas escape but not allow electrolyte passage that may interfere with the reproducible function of the vent and raise safety concerns. Cap 1001 includes disk 1008 that rests on the gasket, vent 1003 and upper portion 1005. Disk 1008 includes a hole 1007 that permits gas to escape. Hole 1007 may be of any shape, though it has been found that a square shape works well. Vent 1003 covers hole 1007 and is displaced by escaping gas. Vent 1003 is typically rubber, though it may be made of any material that permits gas to escape and withstands high temperatures. A square vent has been found to work well. Upper portion 1005 is welded to disk 1008 at weld spots 1009 and includes holes 1011 to allow the gas to escape. The locations of weld spots 1009 and 1011 shown are purely illustrative and these may be at any suitable location. In a preferred embodiment, the vent mechanism includes a vent cover 1013 made of a hydrophobic gas permeable membrane. Examples of vent cover materials include microporous polypropylene, microporous polyethylene, microporous PTFE, microporous FEP, microporous fluoropolymers, and mixtures and co-polymers thereof (see e.g., U.S. patent application Ser. No. 10/098,193, "Leak Proof Pressure Relief Valve for Secondary Batteries," filed Mar. 15, 2002 for J. Phillips, which is incorporated herein by reference for all purposes). The material should be able to withstand high temperatures.

Hydrophobic gas permeable membranes may be used alone or in conjunction with a tortuous gas escape route. Many other battery venting mechanisms are known in the art and are suitable for use with this invention.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Often the profile of a battery pack for, e.g., a power tool will dictate the size and shape of the battery cells. This invention also pertains to battery packs including one or more nickel zinc battery cells of this invention and appropriate casing, contacts, and conductive lines to permit charge and discharge in an electric device.

Nickel Zinc Battery Design Considerations

Nickel zinc battery designs must take into account several design considerations. Some apply to conventional NiCd or other battery designs, but require designs optimized for NiZn cells, and some challenges are unique to NiZn batteries. The present invention addresses these issues as discussed below.

Electrolyte Leakage

The battery design should minimize leaking of caustic electrolyte from the cell. Electrolyte leakage may minimized by operating at starved conditions (i.e. low amount of electrolyte). Thus, in some embodiments of the present invention, battery cells are provided that are capable of operating at starved conditions. As discussed below, operating at starved conditions presents design considerations that the NiZn batteries of the present invention address. Regardless of whether a cell is operated under starved conditions, electrolyte leakage may be further minimized by providing a liquid impermeable/gas permeable vent cover as discussed above with reference to FIG. 10.

Uniform Electrolyte Distribution

In preferred embodiments, the electrolyte is uniformly distributed through the separator layer. Uniform electrolyte distribution is desirable as it provides uniform current density and thereby helps minimize shape change of the zinc electrode. Uniform distribution is especially important for starved cells.

In some embodiments, uniform electrolyte distribution is facilitated by providing collector disks with uniformly spaced holes through which the electrolyte is added to the cell. However, as discussed above, it is often desirable to provide a collector disk for the zinc electrode that is not perforated in order to improve the attachability of the collector disk, usually copper, to the negative current collectors. Thus, according to various embodiments, the negative collector disk may be unperforated except for a center hole through which electrolyte is added and the positive collector uniformly perforated to provide uniform distribution. In this embodiment, the electrolyte is added through the center hole in the negative collector disk and is then reaches the cylindrical assembly or jellyroll from the holes in the perforated positive collector disk.

Operating under starved conditions also increases the likelihood of battery failure from electrolyte leakage. In some embodiments, a gel reservoir is added to replenish the electrolyte supply as needed as discussed above with respect to FIG. 7.

Hydrogen Evolution/Recombination

The relatively negative electric potential of zinc in zinc electrodes makes it particularly susceptible to hydrogen evolution and corrosion of the negative electrode. In particular, it is more susceptible to hydrogen evolution than cadmium and metal hydride cells. Hydrogen evolution is undesirable because of electrode corrosion, pressure build-up in the cell and potential cell dry-out through electrolyte decomposition. In addition, recombination of hydrogen and oxygen is challenging in a nickel zinc battery. In conventional cells, in which dendrite formation is not a great concern, there is a clear path through the separator for gases to travel between electrodes for the recombination reaction. Unlike with conventional nickel cadmium or nickel metal hydride cells, the nickel zinc cells of the present invention may include a barrier separator layer that blocks zinc dendrite formation. This barrier layer prevents a clear path for evolved oxygen and hydrogen to meet each other in the cell. The gases instead must go around the jellyroll assembly to recombine.

According to various embodiments, the batteries of the present invention may be designed to minimize hydrogen evolution at the zinc electrode. In some embodiments, the negative electrode may include materials that reduce gassing at the negative electrode, such as certain metal oxides.

In some embodiments, the nickel zinc battery design facilitates recombination. As discussed above, recombination in the nickel zinc battery design of the present invention is hindered by the existence of a barrier layer to prevent zinc dendrite penetration. However recombination by other mechanisms can be facilitated in a number of ways. In some embodiments, a catalyst for recombination may be added to the electrodes and/or interior of the can to aid recombination. An example of such a catalyst is silver oxide. In another embodiment, a catalyst such as bismuth is added to the negative electrode to catalyze recombination.

Recombination is also facilitated by even electrolyte distribution. Thus, as described above some embodiments employ perforated collector disks and/or gel reservoirs to improve the uniformity of electrolyte distribution and aid recombination. Recombination is also improved by providing void space for the gases to recombine. In some embodiments, the batteries of the present invention are suitable for operating at starved conditions. As discussed above, the separator layer comprises a barrier layer and a wetting layer. In some embodiments, the wetting layer is adjacent to the zinc electrode. The wetting layer facilitates oxygen transport to the zinc electrode for recombination.

In a preferred embodiment, the oxygen recombination rate in a sub-C cell is at least 150 mA.

Zinc Shape Change/Dendrite Formation

As mentioned, zinc electrodes are susceptible to shape change. During charge/discharge cycling, formation of soluble zincate ion causes redistribution of zinc over the face of the electrode. Shape change results in a dramatic decrease in battery capacity with successive cycles. In addition, zinc electrodes are susceptible to zinc dendrites. Dendrites are crystalline structures having a skeletal or tree-like growth pattern ("dendritic growth") in metal deposition. During cycling, dendrites form in the zinc electrode and, if unchecked, penetrate the separator and reach the positive electrode causing shorts and subsequent loss of battery function.

In some embodiments, the batteries of the present invention include an electrolyte of a composition that limits dendrite formation and other forms of material redistribution in the zinc electrode as discussed above. In some embodiments, the separator layer includes a barrier layer to impede dendrite formation and penetration.

Carbonate

The presence of carbon dioxide in the battery cell neutralizes the alkaline electrolyte and can impede high rate discharge through formation of carbonate. Further, many commercial sources of zinc oxide have significant carbonate content. In a preferred embodiment, zinc employed to fabricate the negative electrode has a relatively low-carbonate content, e.g., not more than about 1% by weight. In addition, it is believed carbonate may form during wet processing using organic compounds. Thus, in a preferred embodiment, the positive electrode is formed by a dry-processing method. In some embodiments, the amount of electrolyte in the cell may be required to be boosted to account for electrolyte that is taken out of solution by a certain amount of carbonate.

Copper Conductive Paths and Impedance Reduction

Copper and copper alloys are particularly preferred materials for the conductive paths associated with the zinc electrode. Copper is preferred because of its low resistivity, relatively low price, and electrochemical compatibility with the zinc electrode. Notably, nickel plated steel is the conductive path for the cadmium electrode in commercial nickel cadmium cells.

In a preferred embodiment, the polarity of the nickel zinc cell is opposite that of a conventional power cell, that is the cap of the nickel zinc cell is negative and the can positive. Approximately 0.5 m$\Omega$ of the overall impedance in a conventional C size power cell may be attributed to the positive current collector and the resistance weld to the cap. This is due in part to the compositional requirements of the terminal given the electrochemistry of conventional power cells. In the present embodiment, the use of copper in the manner described results in a significant impedance reduction at the now negative terminal thus achieving a more power efficient cell.

While copper has better electronic conductivity than steel, it can present fabrication issues. For example, attaching a current collecting copper disk to the copper sheet may require specific laser welding settings and the appropriate jigs to provide continuous pressure during the weld.

As such, the electrical attachment of the collector disk with the negative electrode requires specific manufacturing techniques. In an example embodiment, the copper collector is perforated and attached at multiple points along the negative electrode so that the electrode is attached to the current collector at multiple points along its length. By activating a greater area, the charge efficiency is further enhanced. The perforations also serve to locate the electrode and allow electrolyte to penetrate the stack uniformly during the electrolyte fill operation. In another embodiment, the collector disk is slotted to achieve the named advantages. In another embodiment, the copper collector disk requires only center hole for the electrolyte to enter. The structure of the rest of the disk is then determined by the requirements of the method of attachment (i.e. unperforated, perforated or slotted as required). In another embodiment, the copper collector disk is covered with tin or a tin alloy and attached to the current collectors by soldering. In a preferred embodiment, the current collectors are bent as described above with reference to FIG. 4a to improve attachment of the collector disk to the current collectors.

One disadvantage associated with the welding of current collector disks to the active-material-supporting conductor (current collectors) is that the heat input can damage thin heat sensitive separator membranes. This can promote short circuits and significantly curtail service life. A non-welded pressure contact can mitigate this problem. In certain embodiments, two circular copper disks are connected together with a bent strip of copper. The upper disk is resistance welded to the cap of the cylindrical cell (e.g., a sub-C cell) and the lower disk is pressurized to make electrical contact to the jellyroll.

When the cap (and vent assembly) is mated to the cell body during cell assembly the electrical contact to the jellyroll is maintained by the pressure created by a "spring" that has been inserted between the two parallel copper disks. The spring may be a steel spring that has been plated with copper, tin, or another protective metal that has high hydrogen overpotential. Alternatively the spring may be substituted for with a pressurized rubber annulus or "o" ring that is resistant to the alkaline media. Such materials may be EPDM (Ethylene Propylene Diene Monomer) or Viton® (fluoroelastomer family from DuPont Dow Elastomers, L.L.C.). In either case sufficient pressure is maintained such that low impedance electrical resistance is maintained between the cap and jellyroll. In certain embodiments, the pressure exerted by the o-ring presses downward through or from a crimp in the cell can. In some cases, it is desirable to provide a reinforced bottom of the can.

While this method is particularly useful for the negative electrode contact where there is minimal oxidation of the metal parts and minimal oxidation of organic-based rubber compounds it may nevertheless also be applied to the positive electrode. In such cases, the contact surface may be two interconnected nickel disks that are pressurized by a similar spring arrangement. However, there may be some degradation over time associated with the formation of resistive nickel oxides on the nickel contact area. In order to prevent the progressive build up of resistance the disks may be electroplated with cobalt. Although still subject to oxidation the cobalt oxides provide much better conductivity than nickel oxides.

One skilled in the art will appreciate that the foregoing advantages may be achieved by coating or plating the interior surface of the can with copper in a nickel zinc power cell with conventional polarity.

The battery cells of the present invention have low overall impedance, due in part to the negative cap arrangement discussed above. In a preferred embodiment, a nickel-zinc sub-C cell has an overall AC impedance of between about 3 and 5 mΩ. In an even more preferred embodiment, the cell has an AC impedance of between about 3.5 and 4.5 mΩ. By comparison the overall AC impedance of Sanyo's power tool sub-C cell NiCd battery is 5.3 mΩ

The foregoing describes the instant invention and its presently preferred embodiments. Numerous modifications and variations in the practice of this invention are expected to occur to those skilled in the art. For example, while the above specification describes cylindrical cells, certain aspects of the invention apply to other cell designs as well, such as primatic cell designs. Such modifications and variations are encompassed within the following claims.

The entire disclosures of all references cited herein are incorporated by reference for all purposes.

What is claimed is:

1. A wound electrode cylindrical nickel zinc battery cell comprising:
   a) a negative electrode layer comprising zinc and a negative current collector substrate;
   b) a positive electrode layer comprising nickel and a positive current collector substrate;
   c) a separator layer to separate the positive electrode layer and the negative electrode layer; and
   d) a slotted current collector disk comprising radial open sections that are open at the circumferential edge of the slotted current collector disk and vertical energy directors that make intimate contact with the negative current collector substrate of the wound electrode, wherein one end of the negative current collector substrate is bent to form a substantially flat surface for electrical communication with the slotted current collector disk wherein the negative current collector substrate has material removed at the bend point of the bent end.

2. The battery cell of claim 1, wherein the negative electrode layer is between 16 and 24 mils thick and the positive electrode layer is between 16 and 24 mils thick.

3. The battery cell of claim 1, wherein the separator layer comprises a barrier layer and a wetting layer, each made of a different material.

4. The battery cell of claim 1, wherein the barrier layer and the wetting layer are the same material.

5. The battery cell of claim 3, wherein the barrier layer is between about 2 and about 4 mils thick.

6. The battery cell of claim 1, wherein the slotted current collector disk is in electrical communication with the negative current collector substrate, and is copper with one side coated with tin or a tin alloy.

7. The battery cell of claim 1 further comprising an electrolyte, wherein at least some of the electrolyte is in gel form.

8. The battery cell of claim 6 further comprising a can electrically connected to the positive current collector substrate via a positive collector disk interposed between the current collector substrate and the can.

9. The battery cell of claim 8, wherein the positive current collector disk is perforated.

10. The battery cell of claim 3, wherein the wetting layer is adjacent to the negative electrode layer and the barrier layer is adjacent to the positive electrode layer.

11. The battery cell claim 1 wherein the overall AC impedance is between about 3 and 5.0 mΩ.

12. The battery cell of claim 1, wherein the slotted current collector disk further comprises a center hole.

13. The battery cell of claim 1, wherein the negative current collector substrate comprises a perforated copper sheet.

14. The battery cell of claim 13, wherein the perforated copper sheet is between about 2 mils and about 5 mils thick.

15. The battery cell of claim 13, wherein the perforated copper sheet is about 2 mils thick.

16. The battery cell of claim 1, further comprising a cap and vent mechanism configured to vent at a cell pressure of between about 300 psi and about 600 psi.

17. The battery cell of claim 1, further comprising a cap and vent mechanism configured to vent at a cell pressure of between about 300 psi and about 450 psi.

* * * * *